United States Patent
Fu et al.

(10) Patent No.: US 10,891,873 B2
(45) Date of Patent: Jan. 12, 2021

(54) METHOD AND APPARATUS FOR MONITORING LEARNING AND ELECTRONIC DEVICE

(71) Applicant: BEIJING YIZHEN XUESI EDUCATION TECHNOLOGY CO., LTD., Beijing (CN)

(72) Inventors: Guowei Fu, Beijing (CN); Gang Xue, Beijing (CN); Yuemei Li, Beijing (CN); Shan An, Beijing (CN); Mingxiu Meng, Beijing (CN); Yujia Song, Beijing (CN); Yangang Feng, Beijing (CN); Xu Meng, Beijing (CN)

(73) Assignee: BEIJING YIZHEN XUESI EDUCATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/720,070

(22) Filed: Dec. 19, 2019

(65) Prior Publication Data
US 2020/0126444 A1    Apr. 23, 2020

Related U.S. Application Data

(63) Continuation of application No. PCT/CN2018/086686, filed on May 14, 2018.

(30) Foreign Application Priority Data

Jun. 23, 2017   (CN) .......................... 2017 1 0487794

(51) Int. Cl.
G09B 19/00   (2006.01)
G06K 9/00    (2006.01)
(Continued)

(52) U.S. Cl.
CPC ......... G09B 19/00 (2013.01); G06K 9/00281 (2013.01); G06K 9/00302 (2013.01);
(Continued)

(58) Field of Classification Search
CPC ............... G09B 19/00; G06K 9/00281; G06K 9/00302; G06K 9/00342; G06K 9/00268;
(Continued)

(56) References Cited

U.S. PATENT DOCUMENTS 4,973,149 A  * 11/1990  Hutchinson ............ A61B 3/113
                                                        351/210
8,515,127 B2 *  8/2013  Brown ................. G06K 9/4614
                                                        382/103
(Continued)

FOREIGN PATENT DOCUMENTS

CN    106250822 A    12/2016
CN    106599881 A    4/2017
(Continued)

OTHER PUBLICATIONS

Ren et al. "Human Action Recognition in Smart Classroom". Proceedings of the Fifth IEEE International Conference on Automatic Face and Gesture Recognition (FGR02) (Year: 2002).*
(Continued)

*Primary Examiner* — Robert J Utama

(57) ABSTRACT

A method and apparatus for monitoring learning and an electronic device are provided. The method for monitoring learning includes: acquiring a class image of a class student; recognizing the class image to acquire characteristic data of the class student, where the characteristic data includes at least one of the following: facial characteristic data of the class student, visual characteristic data of the class student, and body characteristic data of the class student; and determining, based on the characteristic data of the class student,
(Continued)

Acquiring a class image of a class student — S102

Recognizing the class image to acquire characteristic data of the class student — S104

Determining, according to the characteristic data of the class student, a class status of the class student — S106 a class status of the class student. The listening status of a student learning via a computer and the Internet in a class can be effectively and accurately monitored, and an effective reference is provided for subsequent learning and teaching to further improve the learning or teaching process.

20 Claims, 4 Drawing Sheets

(51) Int. Cl.
 *G06K 9/62* (2006.01)
 *G06Q 50/20* (2012.01)
(52) U.S. Cl.
 CPC ....... *G06K 9/00342* (2013.01); *G06K 9/6202* (2013.01); *G06Q 50/205* (2013.01)
(58) Field of Classification Search
 CPC ............. G06K 9/00771; G06K 9/0778; G06K 9/00785; G06K 9/00335; G06Q 50/205
 See application file for complete search history.

(56) References Cited

U.S. PATENT DOCUMENTS

| | | | | |
|---|---|---|---|---|
| 2008/0169929 A1* | 7/2008 | Albertson | ........ | G08B 13/19613 340/573.1 |
| 2010/0172567 A1* | 7/2010 | Prokoski | ................ | A61B 5/415 382/132 |
| 2011/0007944 A1* | 1/2011 | Atrazhev | ........... | G06K 9/00778 382/103 |
| 2013/0321356 A1* | 12/2013 | Al-Sharif | .............. | G06F 3/0317 345/179 |
| 2014/0072170 A1* | 3/2014 | Zhang | ................ | G06K 9/00624 382/103 |
| 2014/0267611 A1* | 9/2014 | Kennett | ............. | G06K 9/00993 348/46 |
| 2016/0055236 A1* | 2/2016 | Frank | ..................... | G06Q 30/02 707/748 |
| 2016/0098592 A1* | 4/2016 | Lee | .......................... | G06K 9/66 434/236 |
| 2016/0217321 A1* | 7/2016 | Gottlieb | ............. | G06K 9/00308 |
| 2016/0300252 A1* | 10/2016 | Frank | ................ | G06F 16/24578 |
| 2017/0213471 A1* | 7/2017 | Breed | ...................... | G09B 7/07 |
| 2017/0213473 A1* | 7/2017 | Ribeira | .................... | G06T 19/00 |
| 2017/0251360 A1* | 8/2017 | Adamo, Jr. | ............. | G08B 25/08 |
| 2018/0125404 A1* | 5/2018 | Bott | .................... | H04N 5/23293 |
| 2018/0173404 A1* | 6/2018 | Smith | .................... | G06T 19/006 |
| 2018/0247560 A1* | 8/2018 | Mackenzie | ............ | A61B 16/00 |
| 2018/0300830 A1* | 10/2018 | Darnell | ................ | G06K 9/00302 |
| 2019/0066324 A1* | 2/2019 | Hodge | ....................... | G06T 7/70 |
| 2020/0135045 A1* | 4/2020 | Alyuz Civitci | .... | G06K 9/00315 |

FOREIGN PATENT DOCUMENTS

| | | |
|---|---|---|
| CN | 106652605 A | 5/2017 |
| CN | 106846949 A | 6/2017 |
| CN | 106851216 A | 6/2017 |
| CN | 106851579 A | 6/2017 |
| CN | 107292271 A | 10/2017 |

OTHER PUBLICATIONS

Chengeta, Kenneth. "Comparative Analysis of Emotion Detection from Facial Expressions and Voice Using Local Binary Patterns and Markov Models". ICVISP 2018, Aug. 27-29, 2018, Las Vegas, NV, USA (Year: 2018).*

* cited by examiner

METHOD AND APPARATUS FOR MONITORING LEARNING AND ELECTRONIC DEVICE

CROSS REFERENCE TO RELATED APPLICATIONS

This application is a continuation of international application No. PCT/CN2018/086686, filed on May 14, 2018, which claims priority to Chinese Patent Application No. CN201710487794.2, filed on Jun. 23, 2017, which applications are incorporated by reference herein in their entirety.

TECHNICAL FIELD

Embodiments of the present disclosure relate to the field of computer technology, and in particular, relate to a method and apparatus for monitoring learning and an electronic device.

BACKGROUND

With the development of computer and Internet technologies, the use of computers and the Internet to assist learning and teaching has become a trend. For example, teachers can use computers and the Internet to teach students in multiple classrooms by means of live broadcast or recording, and students can choose their favorite teachers and courses in this way.

Although this method greatly facilitates student learning and teacher teaching, no effective way has emerged currently to monitor the listening status of a student in a class, so as to monitor the student's learning and then adjust the corresponding learning method or teaching method to improve the learning result.

SUMMARY

In view of the above, embodiments of the present disclosure provide a method and apparatus for monitoring learning and an electronic device, to address the problem in the related art that the listening status of a student learning via a computer and the Internet in a class cannot be effectively monitored.

According to an aspect of the embodiments of the present disclosure, a method for monitoring learning is provided, including: acquiring a class image of a class of students; recognizing the class image to acquire characteristic data of the class student, where the characteristic data includes at least one of the following: facial characteristic data of the class student, visual characteristic data of the class student, and body characteristic data of the class student; and determining, based on the characteristic data of the class student, a status of the class.

According to another aspect of the embodiments of the present disclosure, an apparatus for monitoring learning is also provided, including: a first acquiring module, configured to acquire a class image of a class of students; a second acquiring module, configured to recognize the class image to acquire characteristic data of the class student, where the characteristic data includes at least one of the following: facial characteristic data of the class student, visual characteristic data of the class student, and body characteristic data of the class student; and a determining module, configured to determine, based on the characteristic data of the class student, a status of the class.

According to a further aspect of the embodiments of the present disclosure, an electronic device is also provided, including a processor, a memory, a communications interface and a communication bus, where the processor, the memory and the communications interface complete communication between each other through the communication bus; and the memory is configured to store at least one executable instruction that causes the processor to execute the operations corresponding to the method for monitoring learning as described above.

According to a still further aspect of the embodiments of the present disclosure, a computer storage medium is also provided, storing: an executable instruction for acquiring a class image of a class of students; an executable instruction for recognizing the class image to acquire characteristic data of the class student, where the characteristic data includes at least one of the following: facial characteristic data of the class student, visual characteristic data of the class student, and body characteristic data of the class student; and an executable instruction for determining, based on the characteristic data of the class student, a status of the class.

Based on the solutions provided by the embodiments of the present disclosure, a class image of a class of students is acquired and identified to determine characteristic data of the class student, and then a class status of the student in the class is determined. The facial characteristic data, visual characteristic data and body characteristic data of a student can express student's information about expression, vision, body action and the like in the class, and the information can effectively reflect the current listening status of the student, so the class status of the student can be monitored and analyzed from multiple dimensions such as expression, vision, body action and the like through the facial characteristic data, visual characteristic data and body characteristic data of the student, the learning status of a student learning via a computer and the Internet in a class is effectively and accurately monitored, and an effective reference is provided for subsequent learning and teaching to further improve the learning or teaching process.

BRIEF DESCRIPTION OF THE DRAWINGS

To describe the technical solutions in the embodiments of the present disclosure or in the related art more clearly, the following briefly introduces the accompanying drawings required for describing the embodiments or the related art. Apparently, the accompanying drawings in the following description show only some embodiments of the present disclosure, and a person of ordinary skill in the art may still derive other drawings from these accompanying drawings.

DETAILED DESCRIPTION

Nevertheless, it is not necessary to require that any technical solution according to the embodiments of the present disclosure achieves all of the above technical effects.

For better understanding of the technical solutions according to the embodiments of the present disclosure by a person skilled in the art, the technical solutions of the present disclosure are clearly and completely described with reference to the accompanying drawings of the embodiments of the present disclosure. Apparently, the described embodiments are only a part of the embodiments of the present disclosure, rather than the entire embodiments. Based on the embodiments of the present disclosure, all other embodiments derived by persons of ordinary skill in the art without any creative effort shall fall within the protection scope of the present disclosure.

Embodiment 1

Figure 1:
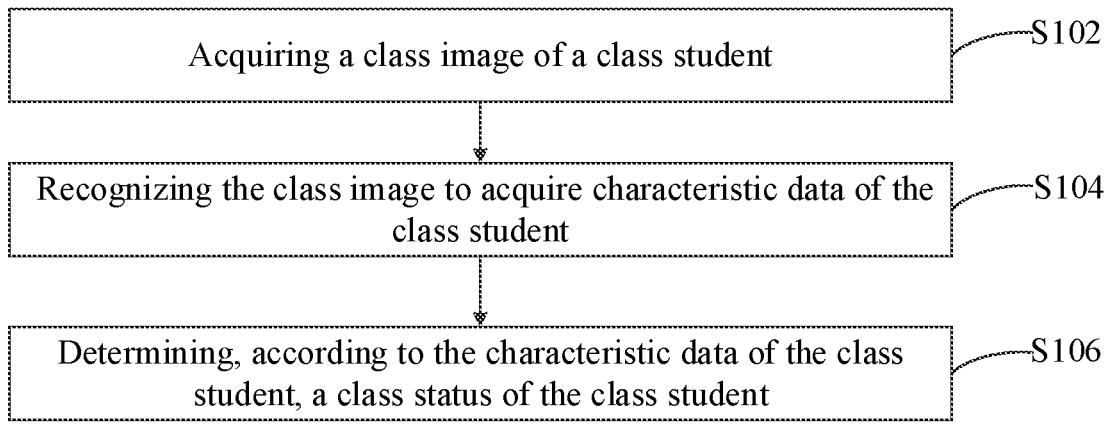
FIG. 1 is an operation flowchart of a method for monitoring learning according to a first embodiment of the present disclosure.

Referring to FIG. 1, an operation flowchart of a method for monitoring learning according to a first embodiment of the present disclosure is shown.

The method for monitoring learning according to the present embodiment includes the following operations:

Operation S102: acquiring a class image of a class of students.

In the present embodiment, the class image may be acquired by sampling pictures taken by a camera, for example, a picture is taken once every certain interval (1 s). The class image may also be acquired from a class video, for example, automatically captured from a class video.

Generally, if multiple students learn in a classroom at the same time, these students are class students in the embodiments of the present disclosure, but those skilled in the art should understand that the embodiments of the present disclosure are also applicable to the situation of a single class student.

Operation S104: recognizing the class image to acquire characteristic data of the class student.

The characteristic data of the class student includes at least one of the following: facial characteristic data of the class student, visual characteristic data of the class student, and body characteristic data of the class student. The facial characteristic data of the class student characterizes facial characteristics of the class student, the class student can be identified through the facial characteristic data, and facial actions and expressions of the class student can also be determined according to the facial characteristic data; the visual characteristic data of the class student characterizes visual characteristics of the class student, and a current visual attention point of the class student can be determined through the visual characteristic data; and the body characteristic data of the class student characterizes body action characteristics of the class student, and a current action of the class student can be determined through the body characteristic data.

The facial characteristic data, visual characteristic data and body characteristic data of the class student can express class student's information about expression, vision, posture and the like, and the information can effectively reflect the current status of the class.

Operation S106: determining, based on the characteristic data of the class student, a status of the class.

For example, the class status includes whether the student concentrates on listening, whether the student actively participates in class interaction activity, whether the student likes the course or the teacher, etc.

According to the present embodiment, a class image of a class of students is acquired and identified to determine characteristic data of the class student, and then a class status of the student in the class is determined. The facial characteristic data, visual characteristic data and body characteristic data of a student can express student's information about expression, vision, body action and the like in the class, and the information can effectively reflect the current listening status of the student, so the class status of the student can be monitored and analyzed from multiple dimensions such as expression, vision, body action and the like through the facial characteristic data, visual characteristic data and body characteristic data of the student, the listening status of the student learning via a computer and the Internet in the class is effectively and accurately monitored, and an effective reference is provided for subsequent learning and teaching to further improve the learning or teaching process.

The method for monitoring learning according to the present embodiment may be implemented by any appropriate device or apparatus having a data processing function, including but not limited to various terminals, servers, etc.

Embodiment 2

Figure 2:
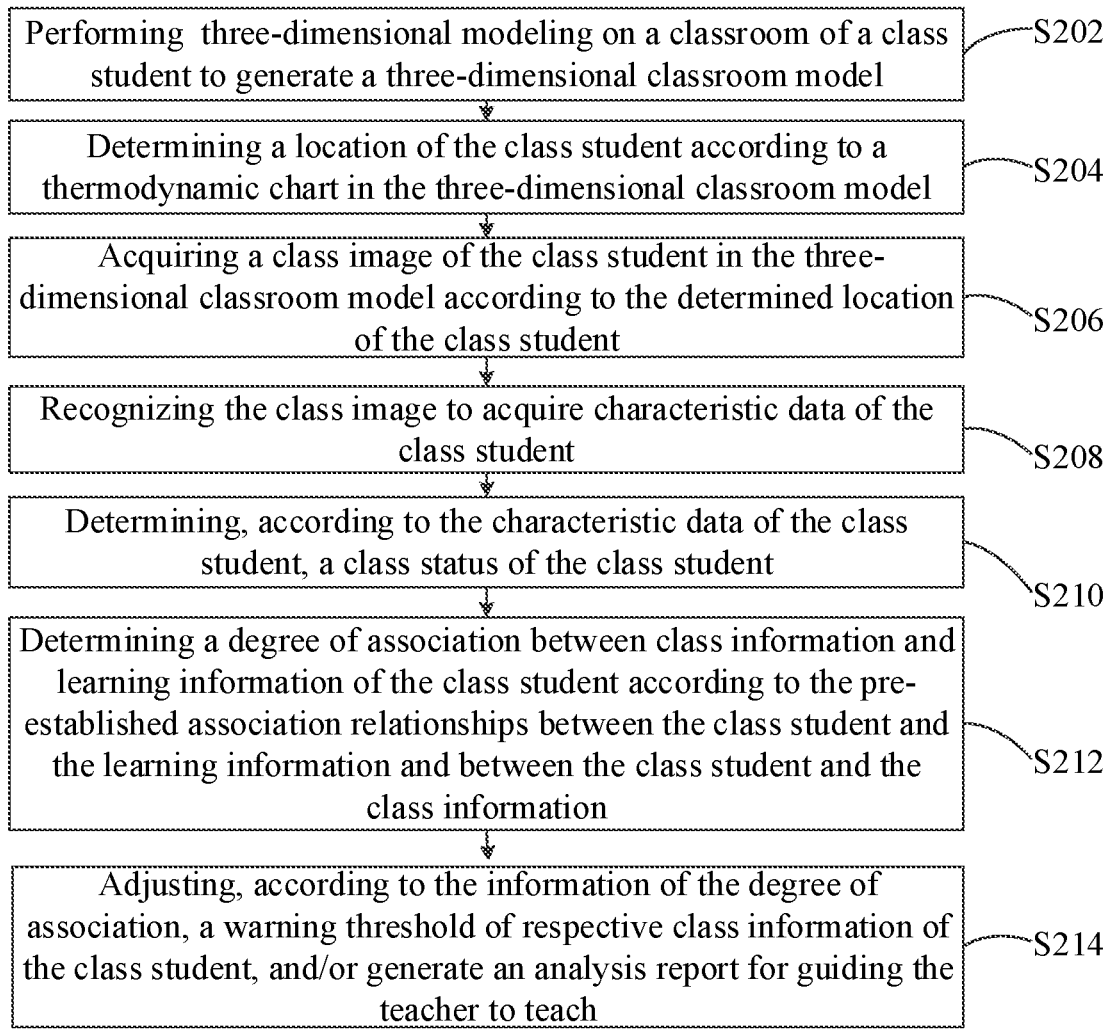
FIG. 2 is an operation flowchart of a method for monitoring learning according to a second embodiment of the present disclosure.

Referring to FIG. 2, an operation flowchart of a method for monitoring learning according to a second embodiment of the present disclosure is shown.

The method for monitoring learning according to the present embodiment includes the following operations:

Operation S202: performing three-dimensional modeling on a classroom of a class student to generate a three-dimensional classroom model.

In the present embodiment, the classroom is modeled using 3D technology through a multi-directional camera. Three-dimensional modeling is a technology that simulates and displays a three-dimensional object by using a computer or other video device, and high drawing speed and high reality can be obtained in modeling and drawing based on an image shot by a camera. Since the image itself contains rich scenario information, a photo-realistic scenario model is obtained more easily from the image. Compared with other methods of obtaining three-dimensional models using modeling software or three-dimensional scanners, the image-based modeling method is low-cost, more realistic and high automatic.

With the three-dimensional classroom model generated by three-dimensional modeling, the monitoring on student learning is more convenient and more realistic, but it should be noted that this operation is an optional operation, and the three-dimensional modeling may also be not performed in practical applications.

Operation S204: determining a location of the class student based on a thermodynamic diagram in the three-dimensional classroom model.

Because the human body radiates certain heat that can be detected by a corresponding device such as an infrared device, the location of the student in the classroom can be determined based on the three-dimensional classroom model in combination with the human thermodynamic diagram. After the identity of the class student is confirmed, the action and behavior of the student can be tracked through a human thermodynamic diagram, the actual physical location of the student can be determined in real time, the student's identity can be dynamically determined and bound, and image comparison is not required to confirm the student again, so that the efficiency of student identification is improved and the burden of identification is also alleviated. If the identity of the class student cannot be confirmed temporarily, the acquired data can be associated with a class student indicated by a thermodynamic diagram. After the identity of the class student is confirmed, the data is associated with the identified class student. However, it should be apparent to those skilled in the art that other appropriate methods for determining the identity of a student, such as image comparison, are also applicable to the solutions of the embodiments of the present disclosure.

Operation S206: acquiring a class image of the class student in the three-dimensional classroom model based on the determined location of the class student.

When the class image of the class student is acquired, an overall image of the classroom of the class student may be acquired, and a class image of each class student may be acquired from the overall image; or, a class image of each class student may also be acquired respectively. Preferably, the class image of the class student may be acquired in real time to know the status of the class in time.

The class image of the class student may be acquired in real time from a video; or the class image is acquired by photographing the class student through a camera every short time, where the short time may be appropriately set by a person skilled in the art based on actual needs, for example, is or shorter time, as long as the status of the class can be obtained in time.

In the case where the location of the class student is determined, the class image of the class student can be acquired based on the determined location of the class student, for example, a class image includes images of class students at all locations to avoid omission; Optionally, a class student at certain location is photographed.

In the presence of a thermodynamic diagram, the class image of the class student can be acquired based on the thermodynamic diagram and the location of the class student and when a current state is determined to be in a state of being in class. The student's action and behavior can be tracked through the thermodynamic diagram. When the thermodynamic diagram indicates that the student has been at a certain location for a period of time, it can be determined that the student is currently in class. When the thermodynamic diagram indicates that most students are at different locations from usual locations, it can be determined that the class is over currently.

Operation S208: recognizing the class image to acquire characteristic data of the class student.

The characteristic data of the class student includes at least one of the following: facial characteristic data of the class student, visual characteristic data of the class student, and body characteristic data of the class student.

In the present embodiment, the identification on the class image may be appropriately set by a person skilled in the art based on actual needs, and is not limited by the embodiment of the present disclosure, as long as the facial characteristic data, visual characteristic data, and body characteristic data of the class student can be acquired. For example, a support vector machine SVM algorithm, a convolutional neural network model algorithm, or the like may be used.

Operation S210: determining, based on the characteristic data of the class student, a class status of the class student.

The class status includes at least one of the following: class concentration degree, class interaction degree, and like-degree for a course. The class concentration degree is used to indicate whether the class student concentrates on listening; the class interaction degree is used to characterize whether the class student actively participates in class interaction in interactive teaching launched by the teacher; and the like-degree for a course is used to characterize whether the class student likes the course and/or the teacher of the class.

In a feasible manner, respective characteristic data of the class student may be compared with respective characteristic data of a pre-stored class status sample image based on the characteristic data of the class student, and a current status of each class student and a score corresponding to the current status may be determined based on the comparison results; at least one class status of each class student in class concentration degree, class interaction degree, and like-degree for a course may be determined based on the current status and the score; where the class status sample image is labeled with students' characteristic data, status data, and scores corresponding to the status data. The class status sample image may be an image set, containing a variety of status images of class students in a class as samples, and the class student in each sample image is labeled by characteristics, statuses and corresponding scores. If the characteristic data of a class student is closer to the characteristic data of a class status sample image, for example, the Euclidean distance is within a certain range, it can be considered that the current status of the class student is consistent with the status of the sample image and should correspond to the same score. Then, at least one class status in class concentration degree, class interaction degree, and like-degree for a course is determined based on the determined current status and score of the class student. For example, the degree of preference of the class student on the current class may be determined by comparing the score with a set threshold. The set threshold may be appropriately set by a person skilled in the art based on actual needs, which is not limited by the embodiment of the present disclosure.

For example, for each class student, the facial characteristic data of the class student is compared with the facial characteristic data in the class status sample image, and whether the facial expression of the class student matches the facial expression in the class status sample image is determined based on the comparison result; the facial characteristic data and visual characteristic data of the class student are compared with the facial characteristic data and visual characteristic data in the class status sample image, and whether the gazing direction of the class student matches the gazing direction in the class status sample image is determined based on the comparison result; the body characteristic data of the class student is compared with the body characteristic data in the class status sample image, and whether the body action of the class student matches the body action in the class status sample image is determined based on the comparison result; a first current status of the class student and a first score corresponding to the first current status are determined based on the facial expression matching result, the gazing direction matching result, and the body action matching result; and the class concentration degree of the class student is determined based on the first current status and the first score. For example, if it is determined through the facial characteristic data that the facial expression of a class student matches the facial expression in the sample image, or if it is determined through the facial characteristic data and the visual characteristic data that the gazing direction of the class student matches the gazing direction in the sample image, or if it is determined through the body characteristic data that the body action of the class student matches the body action in the sample image, it can be determined that the class student has high class concentration degree (for example, if a full score of class concentration degree is indicated by 10, the class student may get a score 9, etc.).

For another example, for each class student, the facial characteristic data of the class student is compared with the facial characteristic data in the class status sample image, and whether the mouth action of the class student matches the mouth action in the class status sample image is determined based on the comparison result; the facial characteristic data and visual characteristic data of the class student are compared with the facial characteristic data and visual characteristic data in the class status sample image, and whether the gazing direction of the class student matches the gazing direction in the class status sample image is determined based on the comparison result; the body characteristic data of the class student is compared with the body characteristic data in the class status sample image, and whether the body action of the class student matches the body action in the class status sample image is determined based on the comparison result; a second current status of the class student and a second score corresponding to the second current status are determined based on the mouth action matching result, the gazing direction matching result, and the body action matching result; and the class interaction degree of the class student is determined based on the second current status and the second score. For example, if it is determined through the facial characteristic data that the mouth action of a class student matches the mouth action in the sample image, or if it is determined through the facial characteristic data and the visual characteristic data that the gazing direction of the class student matches the gazing direction in the sample image, or if it is determined through the body characteristic data that the body action of the class student matches the body action in the sample image, it can be determined that the class student has a high class interaction degree (for example, if a full score of class interaction degree is indicated by 10, the class student may get a score 9, etc.). The class interaction degree includes, but is not limited to: answering questions from a teacher, and performing body actions such as raising hands based on instructions of a teacher.

For example, for each student in class, the facial characteristic data of the class student is compared with the facial characteristic data in the class status sample image, and whether the facial expression of the class student matches the facial expression in the class status sample image is determined based on the comparison result; a third current status of the class student and a third score corresponding to the third current status are determined based on the facial expression matching result; and the like-degree for a course of the student in class is determined based on the third current status and the third score. For example, if it is determined through the facial characteristic data that the facial expression of a class student matches the facial expression in the sample image, it can be determined that the class student has a high like-degree for a course (for example, if a full score of like-degree for a course is indicated by 10, the class student may get a score 9, etc.). If the class student likes a class or a teacher, a facial expression such as smile may be presented. Therefore, the like-degree for a course of the class student can be reflected by the facial expression.

Further optionally, a class information curve chart may be generated based on the score corresponding to at least one class status of each class student in a class concentration degree, a class interaction degree and a like-degree for a course, and the acquisition time of the class image.

The facial expression of the class student in the current class image may characterize the concentration degree and/or like degree of the student for the class, e.g., laughter, anger, confusion, etc.; whether the gazing direction of the class student is pointing to the teaching direction of the teacher can characterize the concentration degree of the class student in class; the current body action of the class student, such as sitting upright, turning the head, dropping the head, eating or drinking, playing, lying down, whispering, holding the chin, or leaning on the desk, can characterize the concentration degree and/or interaction degree of the student in class.

For example, corresponding information can be determined by machine learning based on the characteristic data, for example, a facial expression can be determined based on at least mouth characteristic data and/or eye characteristic data in the facial characteristic data; a gazing direction can be determined based on the facial characteristic data and the visual characteristic data, for example, the facial characteristic data indicates that the class student is currently turning his head and the visual characteristic data (including but not limited to eye characteristic data, and optionally, further including eyebrow characteristic data) indicates that the sight of the class student drops, and it can then be determined that the sight of the class student leaves the teacher's direction; a body action can be determined based on the body characteristic data.

Figure 3:
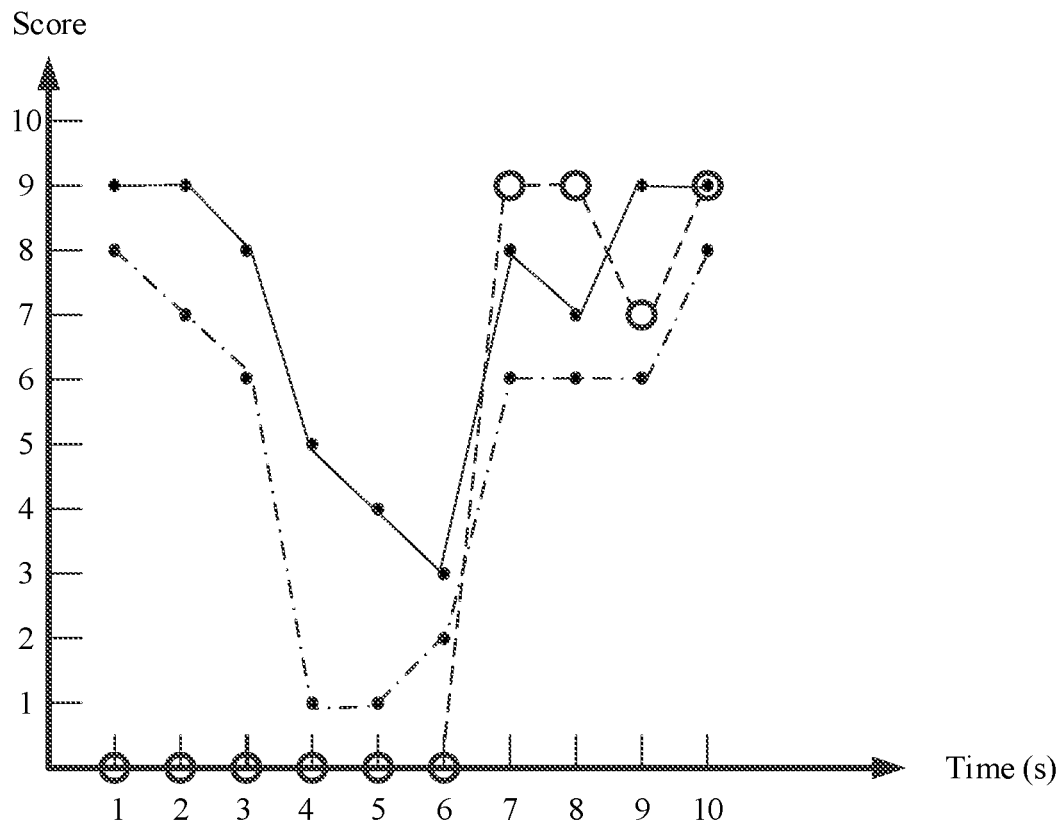
FIG. 3 is a schematic diagram of a class information curve chart according to the embodiment shown in FIG. 2.

Based on the above description, a class information curve chart generated is shown in FIG. 3. FIG. 3 is a class information curve chart of a student in a class such as Zhang San. In FIG. 3, the horizontal coordinates show a time axis, and a class image is acquired every 1 S, containing Zhang San's information; and the vertical coordinates show a score coordinate axis of class statuses of Zhang San. In FIG. 3, the class statuses include class concentration degree, class interaction degree, and a like-degree for a course, but it should be appreciated by those skilled in the art that in practical applications, any one or a combination of the three may be available. Ten class images of Zhang San are shot within 10 S, and the degrees (black solid line) of class concentration degree in the ten class images of Zhang San are determined based on Zhang San's facial expressions, gazing directions and body actions to be respectively (9, 9, 8, 5, 4, 3, 8, 7, 9, 9); the degrees (black dashed line) of class interaction in the ten class images of Zhang San are determined based on Zhang San's mouth actions, gazing directions and body actions to be respectively (0, 0, 0, 0, 0, 0, 9, 9, 7, 9); and the degrees (black dash-and-dot line) of like-degree for a course in the ten class images of Zhang San are determined based on Zhang San's facial expressions to be respectively (8, 7, 6, 1, 1, 2, 6, 6, 6, 8). Zhang San's class status in the class can be clearly known through FIG. 3.

It should be noted that in FIG. 3, three class statuses are presented in the image at the same time, but in actual applications, different class statuses may be presented through multiple images, each of which presents one status.

The class status of each class student is different, so for each class student, the facial characteristic data of each class student is compared with the characteristic data of a pre-stored student facial image to determine identity information of each class student; and the class status of each class student is determined based on the characteristic data and identity information of the class student. Thus, the data, information, and status of the class student are associated with the identity of the class student.

However, in some cases, if the identity information of a class student is not acquired temporarily, then in a feasible manner, if the three-dimensional classroom model has a thermodynamic diagram, and when it is determined that the class student whose identity information is not acquired exists based on the thermodynamic diagram, the characteristic data of the class student whose identity information is not acquired is stored with the corresponding thermodynamic diagram, and after the identity information of the class student is determined, the class status of the class student is determined based on the determined identity information and the characteristic data corresponding to the thermodynamic diagram. That is, the characteristic data is first correspondingly stored with the thermodynamic diagram, then after the identity is determined, the characteristic data is correspondingly stored with the class student identified by the identity information, and the class status of the identified class student is determined based on the characteristic data.

A student face database is set in the system, which stores students' facial images and identity information of the students corresponding to the facial images. By image comparison, each class student in the class image can be identified and confirmed to further determine the learning information corresponding to each class student. The image comparison may be implemented by any appropriate way, including but not limited to facial characteristic comparison.

Further, the current learning situation of the student can be effectively evaluated and processed through the obtained class status, for example, if the class status of the class student satisfies a set alerting condition, alerting is performed. The set alarm condition is appropriately set by a person skilled in the art based on the actual situation, which is not limited in the embodiment of the present disclosure. For example, taking a ten-score system as an example, if student's current class concentration degree is lower than the score 6, the information may be fed back to the teacher, and the teacher handles the information in time.

Operation S212: determining an association degree between the class information and learning information of the class student based on a pre-established association relationship between the class student and the learning information and an association relationship between the class student and the class information.

The class information includes: at least one kind of information of the facial expression, facial action, gazing direction and body action obtained by comparing the respective characteristic data of the class student with the respective characteristic data of the pre-stored class status sample image (for example, information of the facial expression, facial action, gazing direction and body action obtained in operation S210 of determining the status of the class); the learning information includes at least one of the following: performance information of class students, course information of class students, teacher information corresponding to the course information, teaching process information corresponding to the course information, parental satisfaction information of class students, and teaching platform information.

The system stores the pre-established association relationship between each class student and learning information and the association relationship between each class student and class information. Through the identity information of each class student, a corresponding relationship can be established between the class information and learning information of each class student to associate the two. The class information of students is not only closely related to the learning information such as course information of class students, teacher information corresponding to the course information, teaching process information corresponding to the course information and teaching platform information, but also produces key influence on students' performances, the performance information of class students and the parental satisfaction information of class students may reflect and feedback the class information, and the multiple kinds of information are associated to further guide students' learning and course and teacher options and to provide a reference for improvement on students' subsequent learning.

Operation S214: adjusting, based on the information of the association degree, an alerting threshold of the respective class information of the class student, and/or generating an analysis report for guiding the teacher to teach.

For example, a student often holds his chin during class, and this action may lead to a low class concentration degree, but it is found based on the student's performance that the student's performance is good, so it can be initially determined that the action of holding the chin does not indicate low concentration degree. Accordingly, the alerting threshold of the action of the student can be adjusted, and even if the student keeps the action for a period of time, the teacher is not alerted or instructed to take an action.

In addition, a corresponding analysis report may be generated based on the information, and the analysis report may be distributed to a teacher device and/or a parent device to guide the teacher and/or the parent.

It should be noted that operations S212 and S214 are both optional operations.

Through the present embodiment, a class image of a class student is acquired and identified to determine characteristic data of the class student, and then a class status of the student in the class is determined. The facial characteristic data, visual characteristic data and body characteristic data of a student can express student's information about expression, vision, body action and the like in the class, and the information can effectively reflect the current listening status of the student, so the class status of the student can be monitored and analyzed from multiple dimensions such as expression, vision, body action and the like through the facial characteristic data, visual characteristic data and body characteristic data of the student, the listening status of the student learning via a computer and the Internet in the class is effectively and accurately monitored, and an effective reference is provided for subsequent learning and teaching to further improve the learning or teaching process.

The method for monitoring learning according to the present embodiment may be implemented by any appropriate device or apparatus having a data processing function, including but not limited to various terminals, servers, etc.

Embodiment 3

Figure 4:
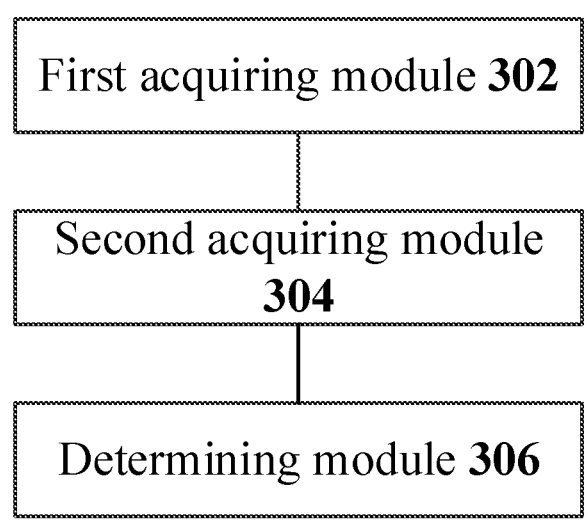
FIG. 4 is a structural block diagram of an apparatus for monitoring learning according to a third embodiment of the present disclosure.

Referring to FIG. 4, a structural block diagram of an apparatus for monitoring learning according to a third embodiment of the present disclosure is shown.

The apparatus for monitoring learning according to the present embodiment includes: a first acquiring module 302, configured to acquire a class image of a class student; a second acquiring module 304, configured to recognize the class image to acquire characteristic data of the class student, where the characteristic data includes at least one of the following: facial characteristic data of the class student, visual characteristic data of the class student, and body characteristic data of the class student; and a determining module 306, configured to determine, based on the characteristic data of the class student, a status of the class.

Through the present embodiment, a class image of a class of students is acquired and identified to determine characteristic data of the class student, and then a class status of the student in the class is determined. The facial characteristic data, visual characteristic data and body characteristic data of the student can express student's information about expression, vision, body action and the like in the class, and the information can effectively reflect the current listening status of the student, so the class status of the student can be monitored and analyzed from multiple dimensions such as expression, vision, body action and the like through the facial characteristic data, visual characteristic data and body characteristic data of the student, the listening status of a student learning via a computer and the Internet in a class is effectively and accurately monitored, and an effective reference is provided for subsequent learning and teaching to further improve the learning or teaching process.

Embodiment 4

Figure 5:
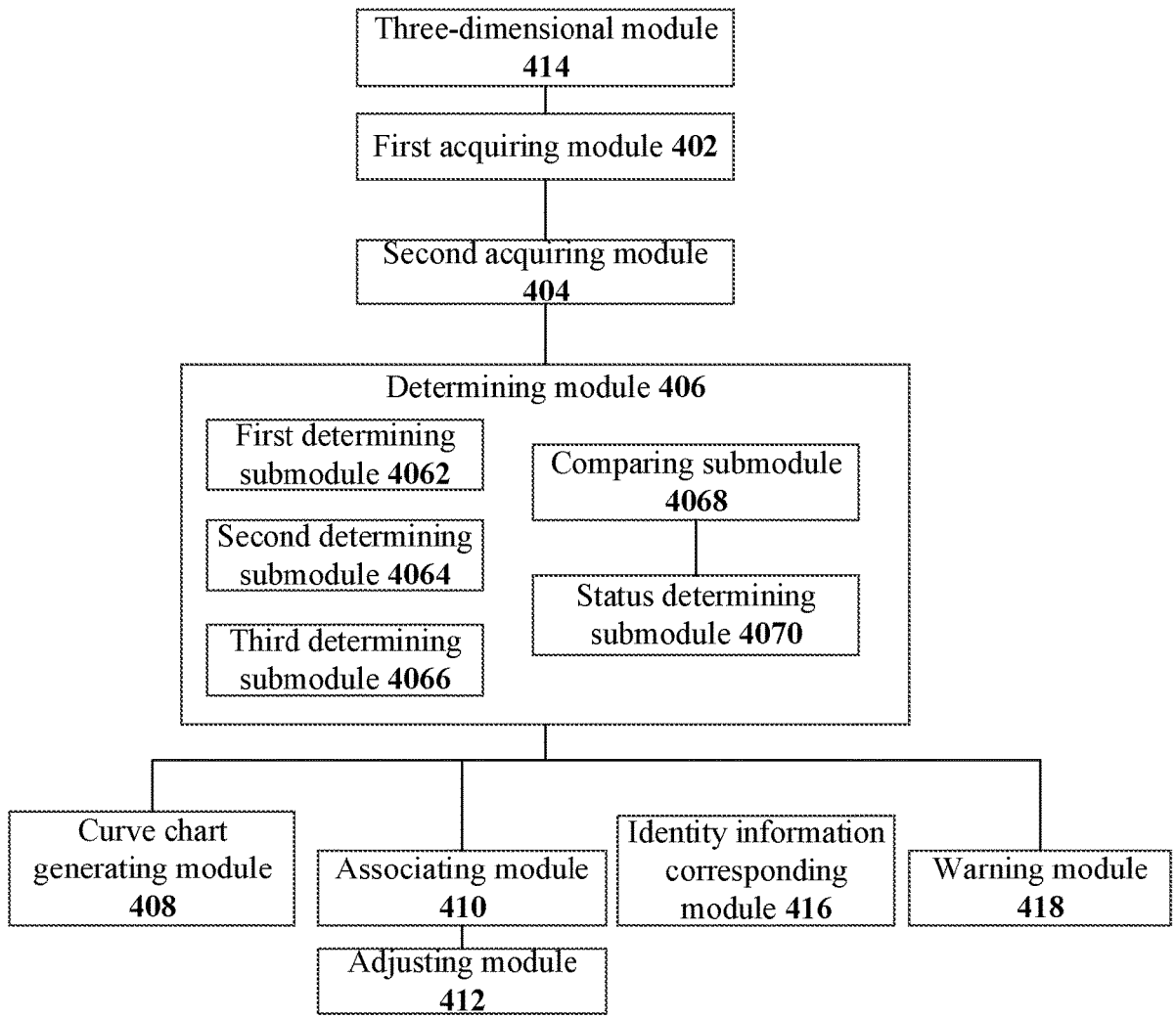
FIG. 5 is a structural block diagram of an apparatus for monitoring learning according to a fourth embodiment of the present disclosure.

Referring to FIG. 5, a structural block diagram of an apparatus for monitoring learning according to a fourth embodiment of the present disclosure is shown.

The apparatus for monitoring learning according to the present embodiment includes: a first acquiring module 402, configured to acquire a class image of a class of students; a second acquiring module 404, configured to recognize the class image to acquire characteristic data of the class student, where the characteristic data includes at least one of the following: facial characteristic data of the class student, visual characteristic data of the class student, and body characteristic data of the class student; and a determining module 406, configured to determine, based on the characteristic data of the class student, a status of the class.

Optionally, the class status includes at least one of the following: a class concentration degree, a class interaction degree, and a like-degree for a course.

Optionally, the determining module 406 is configured to compare respective characteristic data of the class student with respective characteristic data of a pre-stored class status sample image, determine a current status of each class student and a score corresponding to the current status based on the comparison results, and determine, based on the current status and the score, at least one class status of a concentration degree, a class interaction degree, and a like degree for the class like-degree for a course of each class student; where the class status sample image is labeled with students' characteristic data, status data, and scores corresponding to the status data.

Optionally, the determining module 406 includes: a first determining submodule 4062, configured to compare, for each class student, the facial characteristic data of the class student with the facial characteristic data in the class status sample image, and determine whether the facial expression of the class student matches the facial expression in the class status sample image based on the comparison result; compare the facial characteristic data and visual characteristic data of the class student with the facial characteristic data and visual characteristic data in the class status sample image, and determine whether the gazing direction of the class student matches the gazing direction in the class status sample image based on the comparison result; compare the body characteristic data of the class student with the body characteristic data in the class status sample image, and determine whether the body action of the class student matches the body action in the class status sample image based on the comparison result; determine a first current status of the class student and a first score corresponding to the first current status based on the facial expression matching result, the gazing direction matching result, and the body action matching result; and determine the class concentration of the class student based on the first current status and the first score; and/or, a second determining submodule 4064, configured to compare, for each class student, the facial characteristic data of the class student with the facial characteristic data in the class status sample image, and determine whether the mouth action of the class student matches the mouth action in the class status sample image based on the comparison result; compare the facial characteristic data and visual characteristic data of the class student with the facial characteristic data and visual characteristic data in the class status sample image, and determine whether the gazing direction of the class student matches the gazing direction in the class status sample image based on the comparison result; compare the body characteristic data of the class student with the body characteristic data in the class status sample image, and determine whether the body action of the class student matches the body action in the class status sample image based on the comparison result; determine a second current status of the class student and a second score corresponding to the second current status based on the mouth action matching result, the gazing direction matching result, and the body action matching result; and determine the class interaction of the class student based on the second current status and the second score; and/or a third determining submodule 4066, configured to compare, for each class student, the facial characteristic data of the class student with the facial characteristic data in the class status sample image, and determine whether the facial expression of the class student matches the facial expression in the class status sample image based on the comparison result; determine a third current status of the class student and a third score corresponding to the third current status based on the facial expression matching result; and determine the like-degree for a course of the class student based on the third current status and the third score.

Optionally, the apparatus for monitoring learning according to the present embodiment further includes: a curve chart generating module 408, configured to generate a class information curve chart based on the score corresponding to at least one class status of each class student in a class concentration degree, a class interaction degree and a like-degree for a course, and the acquisition time of the class image.

Optionally, the apparatus for monitoring learning according to the present embodiment further includes: an associating module 410, configured to determine an association degree between the class information and learning information of the class student based on a pre-established association relationship between the class student and the learning information, and the association relationship between the class student and the class information; where the class information includes: at least one kind of information of the facial expression, facial action, gazing direction and body action obtained by comparing the respective characteristic data of the class student with the respective characteristic data of the pre-stored class status sample image; and the learning information includes at least one of the following: performance information of class students, course information of class students, teacher information corresponding to the course information, teaching process information corresponding to the course information, parental satisfaction information of class students, and teaching platform information.

Optionally, the apparatus for monitoring learning according to the present embodiment further includes: an adjusting module 412, configured to adjust, based on the information of the association degree, an alerting threshold of respective class information of the class student, and/or generate an analysis report for guiding the teacher to teach.

Optionally, the determining module 406 includes: a comparing submodule 4068, configured to compare the facial characteristic data of each class student with the characteristic data of a pre-stored student facial image to determine identity information of each class student; and a status determining submodule 4070, configured to determine the class status of each class student based on the characteristic data and identity information of the class student.

Optionally, the apparatus for monitoring learning according to the present embodiment further includes: a three-dimensional module 414, configured to perform, before the first acquiring module 402 acquires the class image of the class student, three-dimensional modeling on a classroom of the class student to generate a three-dimensional classroom model, and determine a location of the class student based on a thermodynamic diagram in the three-dimensional classroom model; and the first acquiring module 402 is configured to acquire, based on the determined location of the class student, the class image in the three-dimensional classroom model.

Optionally, the apparatus for monitoring learning according to the present embodiment further includes: an identity information corresponding module 416, configured to store, if it is determined a class student whose identity information is not acquired exists based on the thermodynamic diagram, the characteristic data of the class student whose identity information is not acquired with the corresponding thermodynamic diagram, and determine, after the identity information is determined, the status of the class based on the determined identity information and the characteristic data corresponding to the thermodynamic diagram.

Optionally, the apparatus for monitoring learning according to the present embodiment further includes: an alerting module 418, configured to perform alerting operation if the status of the class satisfies a set alerting condition.

Optionally, the first acquiring module 402 is configured to acquire an overall image of the classroom of the class student, and acquire a class image of each class student from the overall image; or, acquire a class image of each class student respectively.

The apparatus for monitoring learning according to the present embodiment is used to implement the corresponding methods for monitoring learning in the aforementioned multiple method embodiments, and has the beneficial effects of the corresponding method embodiments, and details are not described herein again.

Embodiment 5

Figure 6:
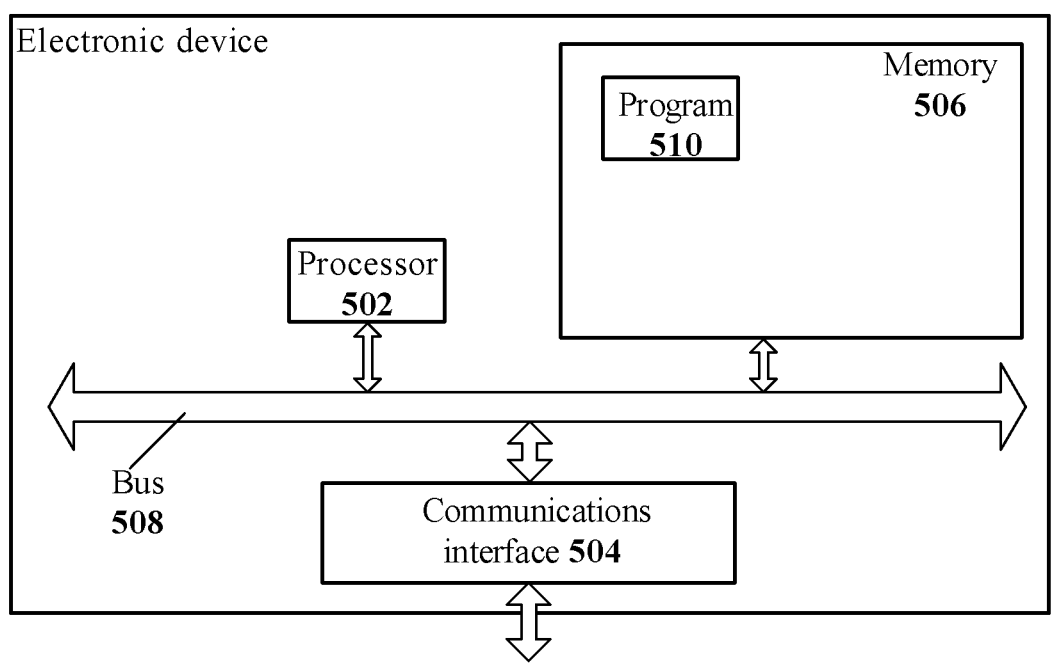
FIG. 6 is a schematic structural diagram of an electronic device according to a fifth embodiment of the present disclosure.

Referring to FIG. 6, a schematic structural diagram of an electronic device according to a fifth embodiment of the present disclosure is shown. The specific embodiment of the present disclosure does not limit the specific implementation of the electronic device.

As shown in FIG. 6, the electronic device may include: a processor 502, a communications interface 504, a memory 506, and a communication bus 508.

In which:

The processor 502, the communications interface 504 and the memory 506 communicate with one another through the communication bus 508.

The communications interface 504 is used for communicating with network elements of other devices such as other terminals or servers.

The processor 502 is configured to execute a program 510, and may specifically execute related operations in the foregoing embodiments of the method for monitoring learning.

Specifically, the program 510 may include program codes including computer operation instructions.

The processor 502 may be a central processing unit (CPU), or an application specific integrated circuit (ASIC), or one or more integrated circuits configured to implement the embodiments of the present disclosure. The electronic device includes one or more processors which may be of the same type, such as one or more CPUs; and the processors may be of different types, such as one or more CPUs and one or more ASICs.

The memory 506 is configured to store the program 510. The memory 506 may include a high-speed random access memory (RAM), and may further include a non-volatile memory, for example, at least one magnetic disc memory.

The program 510 may be specifically configured to cause the processor 502 to perform the following operations: acquire a class image of a class student; recognize the class image to acquire characteristic data of the class student, where the characteristic data includes at least one of the following: facial characteristic data of the class student, visual characteristic data of the class student, and body characteristic data of the class student; and determine, based on the characteristic data of the class student, a class status of the class student.

In an alternative implementation, the class status includes at least one of the following: class concentration, class interaction, and like-degree for a course.

In an alternative implementation, the program 510 is further configured to cause the processor 502 to compare, when the class status of the class student is determined based on the characteristic data of the class student, respective characteristic data of the class student with respective characteristic data of a pre-stored class status sample image, and determine a current status of each class student and a score corresponding to the current status based on the comparison results; and determine, based on the current status and the score, at least one class status of each class student in class concentration, class interaction, and like-degree for a course; where the class status sample image is labeled with students' characteristic data, status data, and scores corresponding to the status data.

In an alternative implementation, the program 510 is further configured to cause the processor 502 to: when comparing respective characteristic data of the class student with respective characteristic data of a pre-stored class status sample image, determining a current status of each class student and a score corresponding to the current status based on the comparison results, and determining, based on the current status and the score, at least one class status of each class student in class concentration, class interaction, and like-degree for a course, for each class student, compare the facial characteristic data of the class student with the facial characteristic data of a class student in the class status sample image, and determine whether the facial expression of the class student matches the facial expression in the class status sample image based on the comparison result; compare the facial characteristic data and visual characteristic data of the class student with the facial characteristic data and visual characteristic data in the class status sample image, and determine whether the gazing direction of the class student matches the gazing direction in the class status sample image based on the comparison result; compare the body characteristic data of the class student with the body characteristic data in the class status sample image, and determine whether the body action of the class student matches the body action in the class status sample image based on the comparison result; determine a first current status of the class student and a first score corresponding to the first current status based on the facial expression matching result, the gazing direction matching result, and the body action matching result; and determine the class concentration of the class student based on the first current status and the first score; and/or compare the facial characteristic data of the class student with the facial characteristic data in the class status sample image, and determine whether the mouth action of the class student matches the mouth action in the class status sample image based on the comparison result; compare the facial characteristic data and visual characteristic data of the class student with the facial characteristic data and visual characteristic data in the class status sample image, and determine whether the gazing direction of the class student matches the gazing direction in the class status sample image based on the comparison result; compare the body characteristic data of the class student with the body characteristic data in the class status sample image, and determine whether the body action of the class student matches the body action in the class status sample image based on the comparison result; determine a second current status of the class student and a second score corresponding to the second current status based on the mouth action matching result, the gazing direction matching result, and the body action matching result; and determine the class interaction of the class student based on the second current status and the second score; and/or compare the facial characteristic data of the class student with the facial characteristic data in the class status sample image, and determine whether the facial expression of the class student matches the facial expression in the class status sample image based on the comparison result; determine a third current status of the class student and a third score corresponding to the third current status based on the facial expression matching result; and determine the like-degree for a course of the class student based on the third current status and the third score.

In an alternative implementation, the program 510 is further configured to cause the processor 502 to generate a class information curve chart based on the score corresponding to at least one class status of each class student in class concentration, class interaction and like-degree for a course, and the acquisition time of the class image.

In an alternative implementation, the program 510 is further configured to cause the processor 502 to determine an association degree between the class information and learning information of the class student based on the pre-established association relationship between the class student and the learning information and the association relationship between the class student and the class information; where the class information includes: at least one kind of information of the facial expression, facial action, gazing direction and body action obtained by comparing the respective characteristic data of the class student with the respective characteristic data of the pre-stored class status sample image; and the learning information includes at least one of the following: performance information of class students, course information of class students, teacher information corresponding to the course information, teaching process information corresponding to the course information, parental satisfaction information of class students, and teaching platform information.

In an alternative implementation, the program 510 is further configured to cause the processor 502 to adjust, based on the information of the association degree, an alerting threshold of respective class information of the class student, and/or generate an analysis report for guiding the teacher to teach.

In an alternative implementation, the program 510 is further configured to cause the processor 502 to compare, when the class state of the class student is determined based on the characteristic data of the class student, the facial characteristic data of each class student with the characteristic data of a pre-stored student facial image to determine identity information of each class student; and determine the class status of each class student based on the characteristic data and identity information of the class student.

In an alternative implementation, the program 510 is further configured to cause the processor 502 to perform, before acquiring the class image of the class student, three-dimensional modeling on a classroom of the class student to generate a three-dimensional classroom model, and determine a location of the class student based on a thermodynamic diagram in the three-dimensional classroom model; and the program 510 is further configured to cause the processor 502 to acquire, when acquiring the class image of the class student, the class image of the class student in the three-dimensional classroom model based on the determined location of the class student.

In an alternative implementation, the program 510 is further configured to cause the processor 502 to store, if it is determined that a class student whose identity information is not acquired exists based on the thermodynamic diagram, the characteristic data of the class student whose identity information is not acquired with the corresponding thermodynamic diagram, and determine, after the identity information is determined, the class status of the class student based on the determined identity information and the characteristic data corresponding to the thermodynamic diagram.

In an alternative implementation, the program 510 is further configured to cause the processor 502 to perform alerting operation if the status of the class satisfies a set alerting condition.

In an alternative implementation, the program 510 is further configured to cause the processor 502 to acquire, when acquiring the class image of the class student, an overall image of the classroom of the class student, and acquire a class image of each class student from the overall image; or, acquire a class image of each class student respectively.

The specific implementations of respective operations in the program 510 may be referred to the corresponding descriptions of corresponding operations and units in the foregoing embodiments of the method for monitoring learning, and details are not described herein again. Persons skilled in the art may clearly understand that, for the sake of convenience and briefness in description, the specific working processes of the above-described devices and modules may be referred to the corresponding processes in the embodiments of the aforementioned methods, and details are not described herein again.

Through the electronic device of the present embodiment, a class image of a class student is acquired and identified to determine characteristic data of the class student, and then a class status of the student in the class is determined. The facial characteristic data, visual characteristic data and body characteristic data of a student can express student's information about expression, vision, body action and the like in the class, and the information can effectively reflect the current listening status of the student, so the class status of the student can be monitored and analyzed from multiple dimensions such as expression, vision, body action and the like through the facial characteristic data, visual characteristic data and body characteristic data of the student, the listening status of the student learning via a computer and the Internet in the class is effectively and accurately monitored, and an effective reference is provided for subsequent learning and teaching to further improve the learning or teaching process.

Through the description of the above embodiments, those skilled in the art can clearly understand that the various embodiments can be implemented by software and a necessary universal hardware platform. Of course, the embodiments can also be implemented by hardware. Based on such an understanding, the above technical solutions substantially or the portions contributing to the related art may be embodied in the form of a software product. The computer software product may be stored in a computer-readable storage medium. The computer-readable storage medium includes any mechanism for storing or transmitting information in a form readable by a computer. For example, the machine-readable medium includes a read-only memory (ROM), a random-access memory (RAM), a disk storage medium, an optical storage medium, a flash storage medium, electrical, optical, acoustic, or other forms of propagated signals (e.g., carriers, infrared signals, digital signals, etc.), and the computer software product includes a plurality of instructions for causing a computer device (which may be a personal computer, a server, or a network device, etc.) to execute the embodiments or the methods described in some parts of the embodiments.

Finally, it should be noted that the above embodiments are only for explaining, but not limiting, the technical solutions of the embodiments of the present disclosure; although the present disclosure has been described in detail with reference to the foregoing embodiments, those of ordinary skill in the art should understood that the technical solutions described in the foregoing embodiments may be modified, or some of the technical features may be equivalently substituted; and such modifications or substitutions do not make the essence of the corresponding technical solutions depart from the spirit and scope of the technical solutions of the present disclosure.

A person skilled in the art should understand that the embodiments of the present disclosure may be provided as a method, an apparatus (a device), or a computer program product. Therefore, the embodiments of the present disclosure may be in the form of full hardware embodiments, full software embodiments, or embodiments combining software and hardware. In addition, the embodiments of the present disclosure may be in the form of a computer program product implemented on one or more computer available storage media (including but not limited to a disk memory, a CD-ROM, an optical memory, and the like) including computer available program codes.

The embodiments of the present disclosure are described with reference to the flow diagrams and/or block diagrams of the methods or apparatuses (devices), and the computer program product in the embodiments of the present disclosure. It should be understood that computer program instructions can implement each process and/or block in the flowcharts and/or block diagrams and a combination of processes and/or blocks in the flowcharts and/or block diagrams. These computer program instructions may be provided to a general-purpose computer, a dedicated computer, an embedded processor, or a processor of other programmable data processing device to generate a machine, so that an apparatus configured to implement functions specified in one or more processes in the flow diagrams and/or one or more blocks in the block diagrams is generated by using instructions executed by the general-purpose computer or the processor of other programmable data processing device.

These computer program instructions may also be stored in a computer readable memory that can guide a computer or another programmable data processing device to work in a specific manner, so that the instructions stored in the computer readable memory generate a product including an instruction apparatus, where the instruction apparatus implements functions specified in one or more processes in the flowcharts and/or one or more blocks in the block diagrams.

These computer program instructions may also be loaded into a computer or another programmable data processing device, so that a series of operation operations are performed on the computer or another programmable data processing device to generate processing implemented by a computer, and instructions executed on the computer or another programmable data processing device provide operations for implementing functions specified in one or more processes in the flowcharts and/or one or more blocks in the block diagrams.

What is claimed is:

1. A method for monitoring learning, comprising:
performing three-dimensional modeling on a classroom of a class student to generate a three-dimensional classroom mode, determining a location of the class student in real time based on a thermodynamic diagram in the three-dimensional classroom model, and associating the class student to a portion of the thermodynamic diagram corresponding to the class student, wherein the thermodynamic diagram is formed based on a detected heat radiated by a human body;
acquiring a class image of the class student in the three-dimensional classroom model when it is determined that the class student is currently in class based on the determined location of the class student;
recognizing the class image to acquire characteristic data of the class student, wherein the characteristic data comprises at least one of the following: facial characteristic data of the class student, visual characteristic data of the class student, and body characteristic data of the class student; and
determining, based on the characteristic data of the class student, a class status of the class student.

2. The method according to claim 1, wherein the class status of the class student comprises at least one of the following: a class concentration degree, a class interaction degree, and a like-degree for a course.

3. The method according to claim 2, wherein the determining, based on the characteristic data of the class student, the class status of the class student comprises: comparing respective characteristic data of the class student with respective characteristic data of a pre-stored class status sample image, and determining a current status of each class student and a score corresponding to the current status based on the comparison results; and determining, based on the current status and the score, at least one class status of each class student in the class concentration degree, the class interaction degree, and the like-degree for a course; wherein the class status sample image is labeled with the characteristic data, status data, and scores corresponding to the status data of each class student.

4. The method according to claim 3, wherein the comparing respective characteristic data of the class student with respective characteristic data of a pre-stored class status sample image, and determining the current status of each class student and the score corresponding to the current status based on the comparison results; and determining, based on the current status and the score, at least one class status of each class student in the class concentration degree, the class interaction degree, and the like-degree for a course, comprises: for each class student,
 comparing the facial characteristic data of the class student with the facial characteristic data in the class status sample image, and determining whether a facial expression of the class student matches the facial expression in the class status sample image based on the comparison result; comparing the facial characteristic data and the visual characteristic data of the class student with the facial characteristic data and the visual characteristic data in the class status sample image, and determining whether a gazing direction of the class student matches the gazing direction in the class status sample image based on the comparison result; comparing the body characteristic data of the class student with the body characteristic data in the class status sample image, and determining whether a body action of the class student matches the body action in the class status sample image based on the comparison result; determining a first current status of the class student and a first score corresponding to the first current status based on the facial expression matching result, the gazing direction matching result, and the body action matching result; and determining the class concentration degree of the class student based on the first current status and the first score; and/or, comparing the facial characteristic data of the class student with the facial characteristic data in the class status sample image, and determining whether a mouth action of the class student matches the mouth action in the class status sample image based on the comparison result; comparing the facial characteristic data and the visual characteristic data of the class student with the facial characteristic data and the visual characteristic data in the class status sample image, and determining whether the gazing direction of the class student matches the gazing direction in the class status sample image based on the comparison result; comparing the body characteristic data of the class student with the body characteristic data in the class status sample image, and determining whether the body action of the class student matches the body action in the class status sample image based on the comparison result; determining a second current status of the class student and a second score corresponding to the second current status based on the mouth action matching result, the gazing direction matching result, and the body action matching result; and determining the class interaction degree of the class student based on the second current status and the second score; and/or,
 comparing the facial characteristic data of the class student with the facial characteristic data in the class status sample image, and determining whether the facial expression of the class student matches the facial expression in the class status sample image based on the comparison result; determining a third current status of the class student and a third score corresponding to the third current status based on the facial expression matching result; and determining the like-degree for a course of the class student based on the third current status and the third score.

5. The method according to claim 4, wherein the method further comprises: determining an association degree between class information and learning information of the class student based on a pre-established association relationship between the class student and the learning information and an association relationship between the class student and the class information,
 wherein the class information comprises: at least one kind of information of the facial expression, facial action, gazing direction and body action obtained by comparing the respective characteristic data of the class student with the respective characteristic data of the pre-stored class status sample image; and the learning information comprises at least one of: performance information of class students, course information of class students, teacher information corresponding to the course information, teaching process information corresponding to the course information, parental satisfaction information of class students, and teaching platform information.

6. The method according to claim 5, wherein the method further comprises: adjusting, based on the information of the association degree, an alerting threshold of respective class information of the class student, and/or generating an analysis report for guiding the teacher to teach.

7. The method according to claim 3, wherein the method further comprises: generating a class information curve chart based on the score corresponding to at least one class status in the class concentration degree, class interaction degree and like-degree for a course, and an acquisition time of the class image of each class student.

8. The method according to claim 1, wherein the determining, based on the characteristic data of the class student, the class status of the class student comprises:
 comparing the facial characteristic data of each class student with the characteristic data of a pre-stored student facial image to determine identity information of each class student; and
 determining the class status of each class student based on the characteristic data and identity information of the class student.

9. The method according to claim 1, wherein the method further comprises: correspondingly storing, when it is determined that a class student whose identity information is not acquired exists based on the thermodynamic diagram, the characteristic data of the class student whose identity information is not acquired with the corresponding thermodynamic diagram, and determining, after the identity information of the class student is determined, the class status of the class student based on the determined identity information and the characteristic data corresponding to the thermodynamic diagram.

10. An electronic device, comprising a processor, a memory, a communications interface and a communication bus, wherein the processor, the memory and the communications interface complete communication between each other through the communication bus; and the memory is configured to store instructions to cause the processor to:
 perform three-dimensional modeling on a classroom of a class student to generate a three-dimensional classroom mode, determine a location of the class student in real time based on a thermodynamic diagram in the three-dimensional classroom model, and associate the class student to a portion of the thermodynamic diagram corresponding to the class student, wherein the thermodynamic diagram is formed based on a detected heat radiated by a human body;

acquire a class image of the class student in the three-dimensional classroom model when it is determined that the class student is currently in class based on the determined location of the class student;

recognize the class image to acquire characteristic data of the class student, wherein the characteristic data comprises at least one of: facial characteristic data of the class student, visual characteristic data of the class student, and body characteristic data of the class student; and determine, based on the characteristic data of the class student, a class status of the class student.

11. The method according to claim 1, wherein the acquiring a class image of the class student in the three-dimensional classroom model comprising:

acquiring an overall image of the classroom of the class student, and acquiring a class image of each class student from the overall image; or acquiring a class image of each class student respectively.

12. The electronic device according to claim 10, wherein the class status of the class student comprises at least one of the following: a class concentration degree, a class interaction degree, and a like-degree for a course.

13. The electronic device according to claim 12, wherein the memory is configured to store instructions to cause the processor to:

compare respective characteristic data of the class student with respective characteristic data of a pre-stored class status sample image, and determine a current status of each class student and a score corresponding to the current status based on the comparison results; and determine, based on the current status and the score, at least one class status of each class student in the class concentration degree, the class interaction degree, and the like-degree for a course; wherein the class status sample image is labeled with the characteristic data, status data, and scores corresponding to the status data of each class student.

14. The electronic device according to claim 10, wherein the memory is configured to store instructions to cause the processor to:

for each class student, compare the facial characteristic data of the class student with the facial characteristic data in the class status sample image, and determine whether a facial expression of the class student matches the facial expression in the class status sample image based on the comparison result; compare the facial characteristic data and the visual characteristic data of the class student with the facial characteristic data and the visual characteristic data in the class status sample image, and determine whether a gazing direction of the class student matches the gazing direction in the class status sample image based on the comparison result; compare the body characteristic data of the class student with the body characteristic data in the class status sample image, and determine whether a body action of the class student matches the body action in the class status sample image based on the comparison result; determine a first current status of the class student and a first score corresponding to the first current status based on the facial expression matching result, the gazing direction matching result, and the body action matching result; and determine the class concentration degree of the class student based on the first current status and the first score; and/or, compare the facial characteristic data of the class student with the facial characteristic data in the class status sample image, and determine whether a mouth action of the class student matches the mouth action in the class status sample image based on the comparison result; compare the facial characteristic data and the visual characteristic data of the class student with the facial characteristic data and the visual characteristic data in the class status sample image, and determine whether the gazing direction of the class student matches the gazing direction in the class status sample image based on the comparison result; compare the body characteristic data of the class student with the body characteristic data in the class status sample image, and determine whether the body action of the class student matches the body action in the class status sample image based on the comparison result; determine a second current status of the class student and a second score corresponding to the second current status based on the mouth action matching result, the gazing direction matching result, and the body action matching result; and determine the class interaction degree of the class student based on the second current status and the second score; and/or, compare the facial characteristic data of the class student with the facial characteristic data in the class status sample image, and determine whether the facial expression of the class student matches the facial expression in the class status sample image based on the comparison result; determine a third current status of the class student and a third score corresponding to the third current status based on the facial expression matching result; and determine the like-degree for a course of the class student based on the third current status and the third score.

15. The electronic device according to claim 10, wherein the memory is configured to store instructions to further cause the processor to:

determine an association degree between class information and learning information of the class student based on a pre-established association relationship between the class student and the learning information and an association relationship between the class student and the class information, wherein the class information comprises: at least one kind of information of the facial expression, facial action, gazing direction and body action obtained by comparing the respective characteristic data of the class student with the respective characteristic data of the pre-stored class status sample image; and the learning information comprises at least one of: performance information of class students, course information of class students, teacher information corresponding to the course information, teaching process information corresponding to the course information, parental satisfaction information of class students, and teaching platform information.

16. The electronic device according to claim 15, wherein the memory is configured to store instructions to further cause the processor to:

adjust, based on the information of the association degree, an alerting threshold of respective class information of the class student, and/or generate an analysis report for guiding the teacher to teach.

17. The electronic device according to claim 13, wherein the memory is configured to store instructions to further cause the processor to:
generate a class information curve chart based on the score corresponding to at least one class status in the class concentration degree, class interaction degree and like-degree for a course, and an acquisition time of the class image of each class student.

18. The electronic device according to claim 10, wherein the memory is configured to store instructions to cause the processor to:
compare the facial characteristic data of each class student with the characteristic data of a pre-stored student facial image to determine identity information of each class student; and determining the class status of each class student based on the characteristic data and identity information of the class student.

19. The electronic device according to claim 10, wherein the memory is configured to store instructions to further cause the processor to:
correspondingly store, when it is determined that a class student whose identity information is not acquired exists based on the thermodynamic diagram, the characteristic data of the class student whose identity information is not acquired with the corresponding thermodynamic diagram; and
determine, after the identity information of the class student is determined, the class status of the class student based on the determined identity information and the characteristic data corresponding to the thermodynamic diagram.

20. The electronic device according to claim 10, wherein the memory is configured to store instructions to cause the processor to:
acquire an overall image of the classroom of the class student, and acquiring a class image of each class student from the overall image; or
acquire a class image of each class student respectively.

* * * * *